United States Patent
Joten

(10) Patent No.: US 9,995,969 B2
(45) Date of Patent: Jun. 12, 2018

(54) LIQUID CRYSTAL DISPLAY DEVICE

(71) Applicant: Japan Display Inc., Minato-ku (JP)

(72) Inventor: Kazuhiro Joten, Tokyo (JP)

(73) Assignee: Japan Display Inc., Minato-ku (JP)

( * ) Notice: Subject to any disclaimer, the term of this patent is extended or adjusted under 35 U.S.C. 154(b) by 94 days.

(21) Appl. No.: 15/264,043

(22) Filed: Sep. 13, 2016

(65) Prior Publication Data

US 2017/0082899 A1  Mar. 23, 2017

(30) Foreign Application Priority Data

Sep. 17, 2015 (JP) ................. 2015-183894

(51) Int. Cl.
| | |
|---|---|
| G02F 1/335 | (2006.01) |
| G02F 1/137 | (2006.01) |
| G02F 1/1343 | (2006.01) |
| G02F 1/1337 | (2006.01) |
| G02F 1/139 | (2006.01) |
| G02F 1/1339 | (2006.01) |
| G02F 1/1335 | (2006.01) |

(52) U.S. Cl.
CPC ...... *G02F 1/1339* (2013.01); *G02F 1/133711* (2013.01); *G02F 2001/13712* (2013.01); *G02F 2001/133519* (2013.01); *G02F 2001/134372* (2013.01)

(58) Field of Classification Search
CPC .......................................... G02F 2001/133519
See application file for complete search history.

(56) References Cited

U.S. PATENT DOCUMENTS

| | | | | |
|---|---|---|---|---|
| 2007/0008480 A1* | 1/2007 | Hong | ............ | G02F 1/1396 349/179 |
| 2009/0168008 A1* | 7/2009 | Huh | ............ | C09K 19/3444 349/167 |
| 2010/0103365 A1* | 4/2010 | Lee | ............ | C09K 19/20 349/167 |
| 2010/0245752 A1 | 9/2010 | Hong et al. | | |
| 2012/0289633 A1* | 11/2012 | Liang | ............ | G02F 1/1337 524/104 |
| 2015/0267117 A1* | 9/2015 | Kim | ............ | C09K 19/3003 349/139 |

FOREIGN PATENT DOCUMENTS

JP  2007-25666  2/2007

* cited by examiner

*Primary Examiner* — Jia Pan
(74) *Attorney, Agent, or Firm* — Oblon, McClelland, Maier & Neustadt, L.L.P.

(57) ABSTRACT

According to one embodiment, a liquid crystal display device includes a first substrate including a first alignment film, a second substrate including a second alignment film opposed to the first alignment film, and a liquid crystal layer held in a cell gap between the first substrate and the second substrate. The liquid crystal layer is formed of a liquid crystal material having a viscosity of 20 mPa*s or more under a condition of 65° C. The cell gap is greater than or equal to 2.3 μm and smaller than or equal to 3.3 μm.

11 Claims, 9 Drawing Sheets

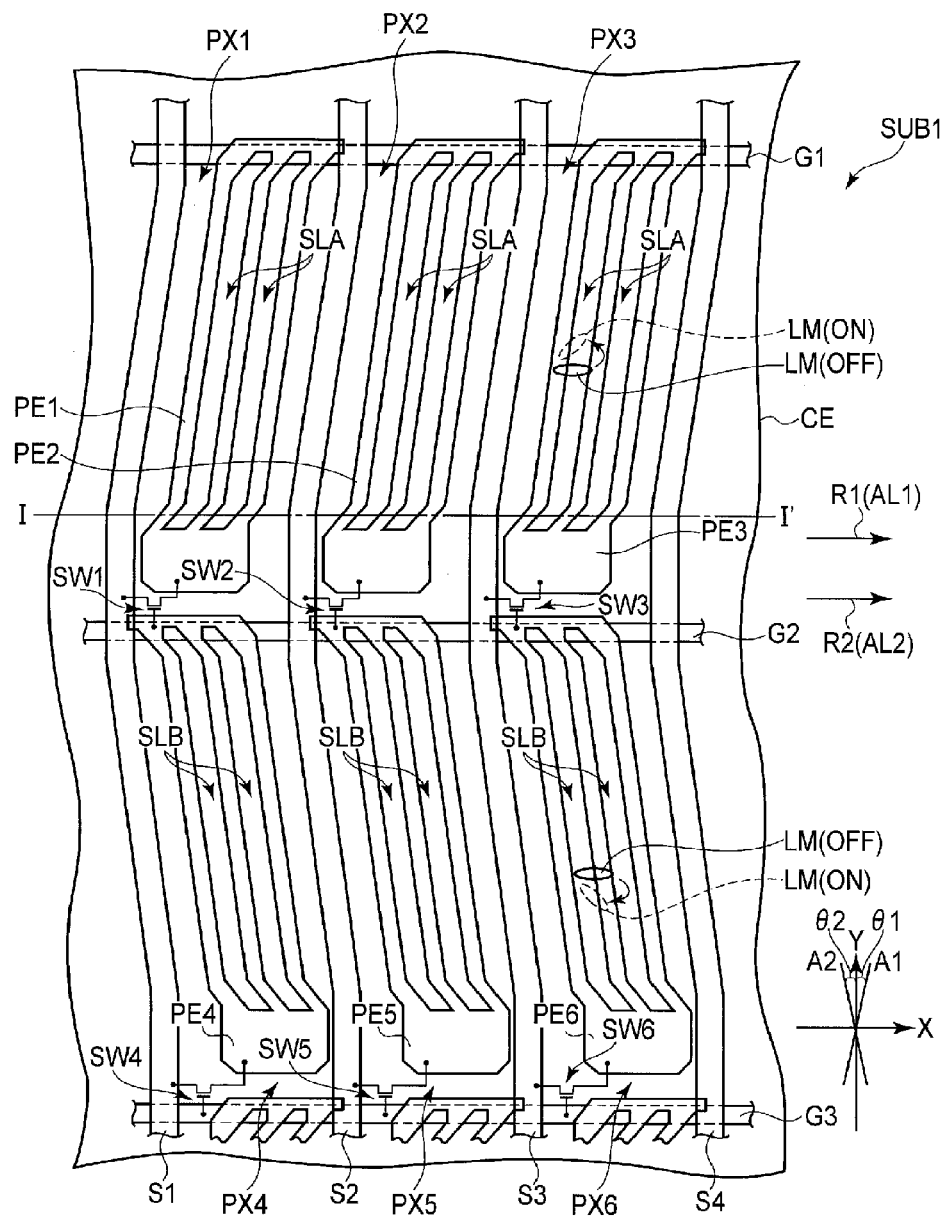
F I G. 2

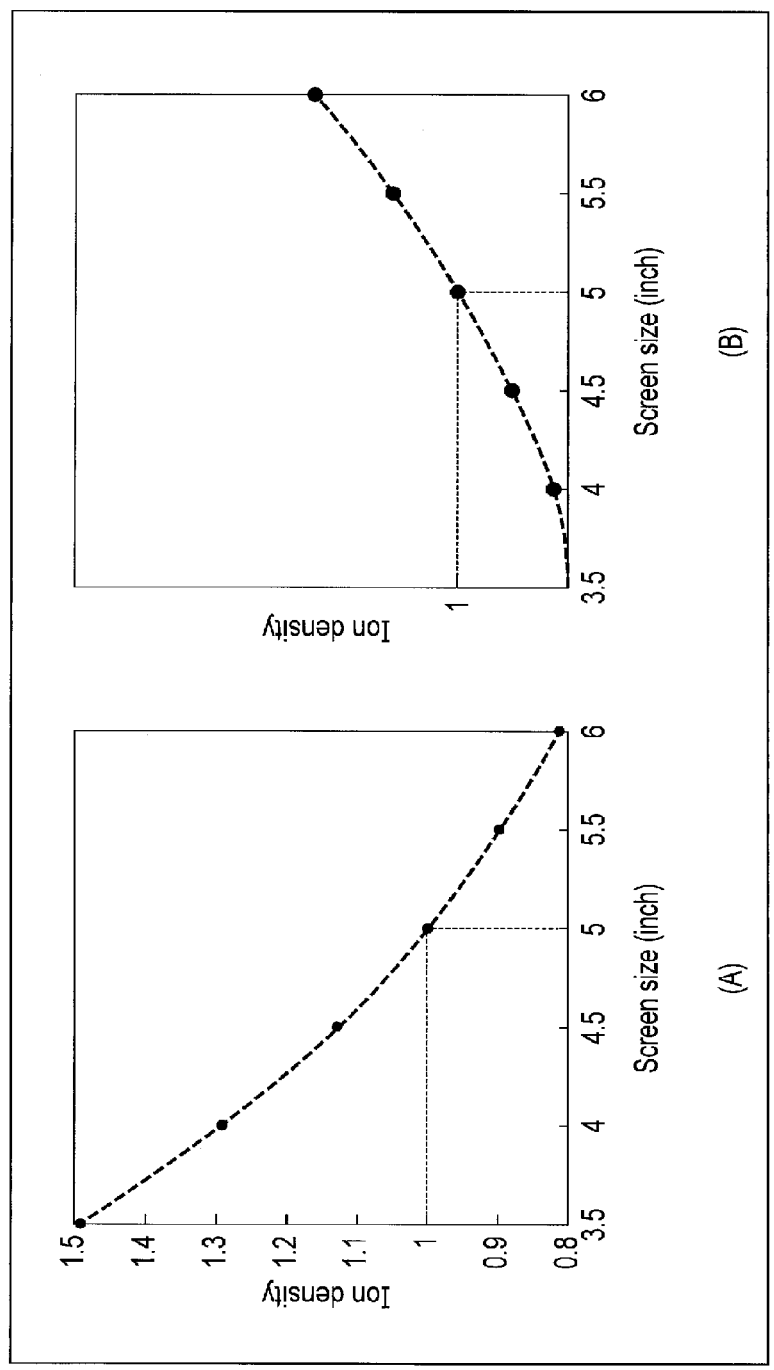
F I G. 4

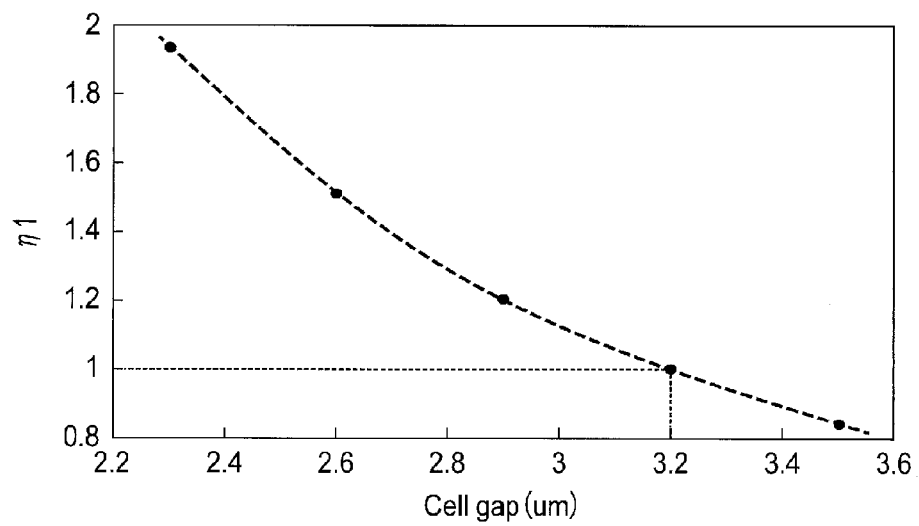
F I G. 5
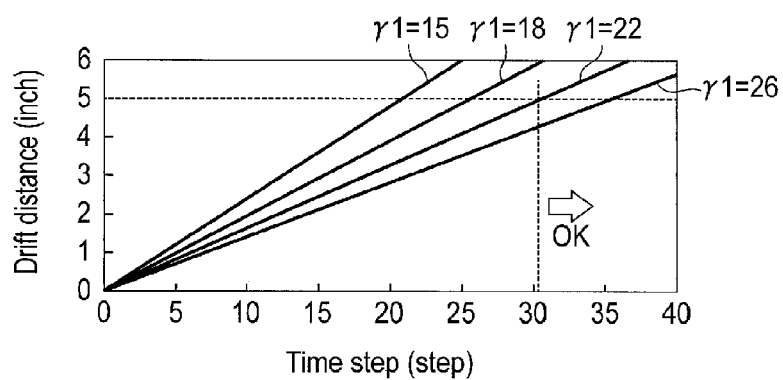
F I G. 6

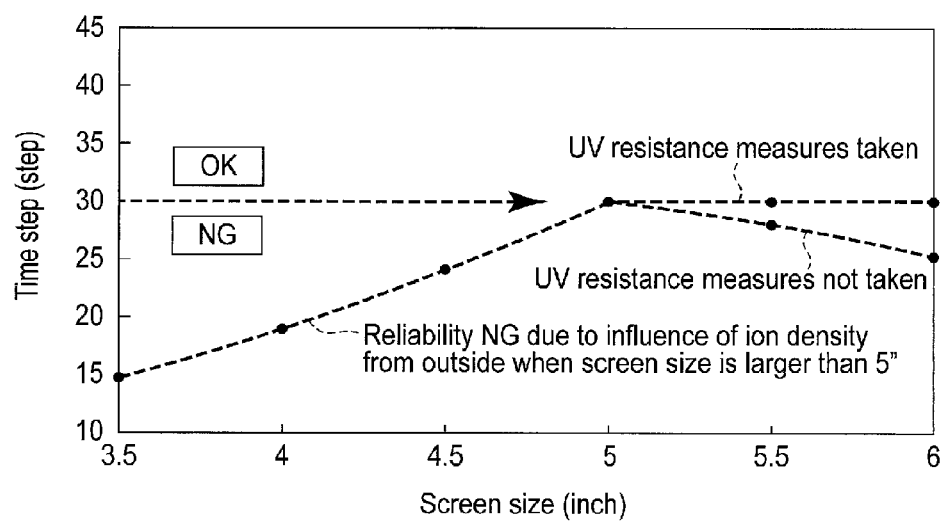
F I G. 7

| Screen size (inch) | Ion density (relative value) | Viscosity (mPa*s) | Cell gap (um) | | Viscosity resistance η of liquid crystal layer (relative value) | Response time (relative value) | Reliability |
|---|---|---|---|---|---|---|---|
| 5.0 | 1.0 | 20(mPa*s) | 3.2 | — | ⇒1.0 | 1.0 | OK |
| 4.5 | 1.13 | ×1.13 ≦ | 3.2/sqrt(1.13) | 3.0 ≧ | 1.24 ≦ | 1.0 ≧ | OK |
| 4.0 | 1.3 | ×1.3 ≦ | 3.2/sqrt(1.3) | 2.8 ≧ | 1.69 ≦ | 1.0 ≧ | OK |
| 3.5 | 1.5 | ×1.5 ≦ | 3.2/sqrt(1.5) | 2.6 ≧ | 2.25 ≦ | 1.0 ≧ | OK |

F I G. 8

| Items | | OC-A | OC-B | OC-C | OC-D |
|---|---|---|---|---|---|
| Reliability on black non-uniformity in display | 65°C / 90% drive | NG | NG | OK | OK |
| Moisture permeability (mol/cm2) | Before UV | 7.0E-9 | 1.5E-9 | 2.3E-9 | 1.7E-9 |
| | After UV | 9.0E-9 | 2.5E-9 | 3.0E-9 | 2.2E-9 |
| UV resistance | Spectral variation amount before and after UV | 0.0030 | 0.0033 | 0.0018 | 0.0017 |

F I G. 10

LIQUID CRYSTAL DISPLAY DEVICE

CROSS-REFERENCE TO RELATED APPLICATIONS

This application is based upon and claims the benefit of priority from Japanese Patent Application No. 2015-183894, filed Sep. 17, 2015, the entire contents of which are incorporated herein by reference.

FIELD

Embodiments described herein relate generally to a liquid crystal display device.

BACKGROUND

For example, a liquid crystal display device comprising a liquid crystal layer held between a first electrode and a second electrode, and having features that the liquid crystal layer is subjected to twisted nematic alignment, that a rotational viscosity of the liquid crystal layer is 50 to 80 mPas, that a cell gap which is the thickness of the liquid crystal layer is 2.5 to 5.0 μm, and that a potential difference between the first electrode and the second electrode is 0.2 to 8.0 V, has been disclosed.

Meanwhile, a problem arises that due to aggregation of ionic impurities in the liquid crystal layer, in a display area, a voltage holding ratio is reduced locally, and that a deterioration in display quality results from non-uniformity in display (for example, black non-uniformity in display that a part of a white display screen is displayed black) is caused.

BRIEF DESCRIPTION OF THE DRAWINGS

FIG. 2 is a plan view showing a partial configuration of the first substrate SUB1 shown in FIG. 1 as seen from the side of the second substrate SUB2.

FIG. 4 shows graphs each representing a result of simulation of a relationship between a screen size of the display panel PNL and an ion density of ionic impurities in a liquid crystal layer LQ.

FIG. 5 is a graph showing a result of simulation of a relationship between the cell gap GP of the display panel PNL and a viscosity resistance η1.

FIG. 6 is a graph showing a result of simulation of a relationship between the time of the reliability test and the drift distance of the ionic impurities.

FIG. 7 is a graph showing a result of simulation of a relationship between the screen size and the time of the reliability test.

FIG. 8 is a table summarizing the conditions for determining the reliability test to be OK for each screen size.

FIG. 10 is a table summarizing a relationship among a result of the reliability test of each configuration example of the display panel, the moisture permeabilities of overcoat layers OC, and spectral variation amounts of the overcoat layers OC.

DETAILED DESCRIPTION

Figure 1:
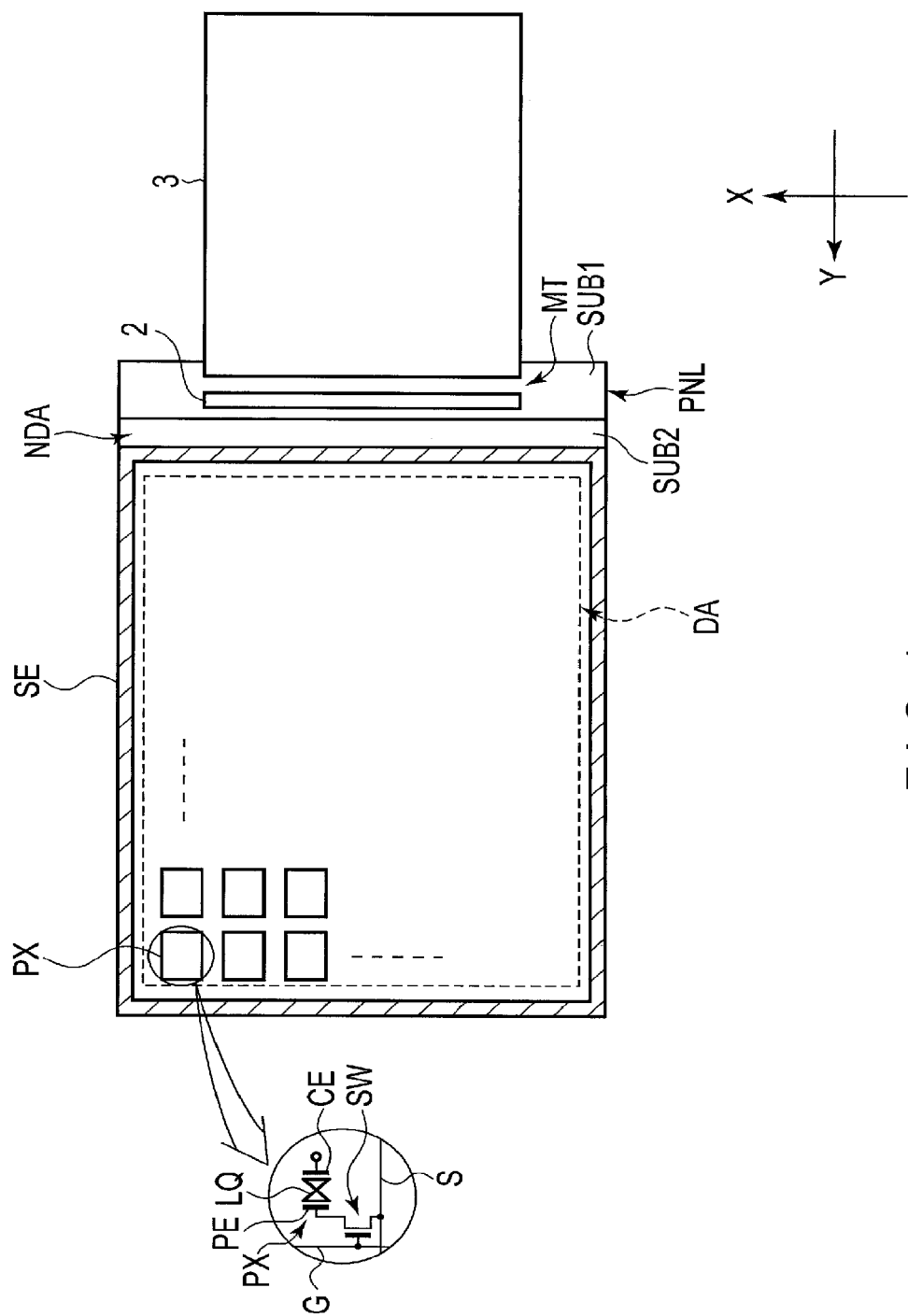
FIG. 1 is a plan view showing a configuration of a display panel PNL constituting a liquid crystal display device of the embodiments.

In general, according to one embodiment, a liquid crystal display device includes: a first substrate including a first alignment film; a second substrate including a second alignment film opposed to the first alignment film; and a liquid crystal layer held in a cell gap between the first substrate and the second substrate, the liquid crystal layer being formed of a liquid crystal material having a viscosity of 20 mPa*s or more under a condition of 65° C., the cell gap being greater than or equal to 2.3 μm and smaller than or equal to 3.3 μm.

According to another embodiment, a liquid crystal display device includes: a first substrate including a first alignment film; a second substrate including an organic insulating film and a second alignment film which is opposed to the first alignment film; and a liquid crystal layer held in a cell gap between the first substrate and the second substrate, the organic insulating film being formed of a transparent photocurable resin material including as a main component an acrylic system resin or an epoxy system resin containing a cross-linking monomer, the organic insulating film having a moisture permeability of 5E-9 mol/cm$^2$ or less, and a difference between a maximum value and a minimum value of a difference in absorbance spectrum before and after ultraviolet rays irradiation of 0.0030 or less.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like of the respective parts are illustrated schematically in the drawings, rather than as an accurate representation of what is implemented, but such schematic illustration is merely exemplary, and in no way restricts the interpretation of the invention. In the specification and drawings, elements like or similar to those described in connection with preceding drawings are denoted by like reference numerals, and their detailed description is omitted unless necessary.

The embodiments will be described hereinafter with reference to the accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape, etc., of each portion as compared with an actual aspect, but they are mere examples and do not restrict the interpretation of the invention. In the present specification and drawings, elements like or similar to those in the already described drawings may be denoted by similar reference numbers and their detailed descriptions may be arbitrarily omitted.

FIG. 1 is a plan view showing a configuration of a display panel PNL constituting a liquid crystal display device of the embodiments. A plan view in an X-Y plane defined by a first direction X and a second direction Y which intersect each other, is illustrated here. The first direction X and the second direction Y are orthogonal to each other, but may intersect at an angle other than 90°.

The display panel PNL is an active-matrix liquid crystal display panel and includes a first substrate SUB1, a second substrate SUB2 opposed to the first substrate SUB1, and a liquid crystal layer LQ held between the first substrate SUB1 and the second substrate SUB2. The first substrate SUB1 and the second substrate SUB2 are bonded to each other by a sealing member SE with a predetermined cell gap formed between the substrates. In the example illustrated, the sealing member SE is formed in a rectangular closed-loop shape. The liquid crystal layer LQ is held on an inner side surrounded by the sealing member SE, in the cell gap between the first substrate SUB1 and the second substrate SUB2. The display panel PNL includes a display area DA in which an image is displayed, on the inner side surrounded by the sealing member SE. The display area DA is formed in, for example, an approximately rectangular shape and constituted by pixels PX arrayed in a matrix.

The first substrate SUB1 includes, in the display area DA, gate lines G extending in the first direction X, source lines S extending in the second direction Y, switching elements SW electrically connected with the gate lines G and the source lines S in the respective pixels PX, pixel electrodes PE connected to the switching elements SW in the respective pixels PX, and the like. A common electrode CE of a common potential is disposed on the first substrate SUB1 or the second substrate SUB2 and opposed to the pixel electrodes PE. The gate lines G and the source lines S may be bent in part or branched in part.

Signal supply sources necessary to drive the display panel PNL, such as a driving IC chip 2 and a flexible printed circuit (FPC) 3 are located in a non-display area (peripheral area) NDA outside the display area DA. In the example illustrated, the driving IC chip 2 and the FPC 3 are mounted on a mounting portion MT of the first substrate SUB1 extending to an outer side than the second substrate SUB2. The non-display area NDA is an area surrounding the display area DA, includes an area in which the sealing member SE is disposed, and is formed in a rectangular shape.

Detailed explanations of the configuration of the display panel PNL are omitted here, but the pixel electrode PE is disposed on the first substrate SUB1 while the common electrode CE is disposed on the second substrate SUB2, in a display mode using a longitudinal electric field extending along the normal line of the main surface or the X-Y plane or a display mode using a tilted electric field angled with respect to the normal line of the main surface of the substrate. In addition, both the pixel electrode PE and the common electrode CE are disposed on the first substrate SUB1, in a display mode using a lateral electric field extending along the main surface of the substrate. Furthermore, the display panel PNL may have a configuration corresponding to a display mode using an arbitrary combination of the longitudinal, lateral, and tilted electric fields.

The display panel PNL is a transmissive display panel having a transmissive display function of displaying an image by, for example, allowing the light from an illumination device (backlight unit) BL which will be explained later to be selectively transmitted, but is not limited to this. The display panel PNL may be a reflective display panel having a reflective display function of displaying an image by allowing the light from the display surface side such as external light and auxiliary light to be selectively reflected. In addition, the display panel PNL may be a transflective display panel having the transmissive display function and the reflective display function. If a reflective display panel PNL is used, the illumination device BL located on a side opposed to the first substrate SUB1 is not disposed. However, if a reflective display panel PNL is used, an illumination device (front-light unit) may be disposed on a side opposed to the second substrate SUB2.

FIG. 2 is a plan view showing a partial configuration of the first substrate SUB1 shown in FIG. 1 as seen from the side of the second substrate SUB2. The configuration of the first substrate SUB1 in a fringe field switching (FFS) mode which is one of the display modes using the lateral electric mode will be exemplified here, and major portions necessary for explanations alone will be illustrated in the drawing.

The first substrate SUB1 includes gate lines G1 to G3, source lines S1 to S4, switching elements SW1 to SW6, the common electrode CE, pixel electrodes PE1 to PE6, a first alignment film AL1 and the like. Each of the gate lines G1 to G3 extends in the first direction X. Each of the source lines S1 to S4 substantially extends in the second direction Y and intersects the gate lines G1 to G3. Pixels PX1 to PX6 are sectioned by the gate lines G1 to G3 and the source lines S1 to S4.

For example, pixels PX1 to PX3 arranged in the first direction X are pixels exhibiting colors different from each other, and pixels PX4 to PX6 are also pixels exhibiting colors different from each other. The pixels PX1 to PX6 include, for example, a green pixel, a blue pixel and a red pixel and may further include a pixel exhibiting the other color (for example, white or the like) as needed.

The pixels PX1 to PX3 extend in a first extending direction A1 which intersects the second direction Y clockwise at an acute angle. The source lines S1 to S4 located on both sides of the pixels PX1 to PX3 extend in the first extending direction A1. The pixels PX4 to PX6 extend in a second extending direction A2 which intersects the second direction Y counterclockwise at an acute angle. The source lines S1 to S4 located on both sides of the pixels PX4 to PX6 extend in the second extending direction A2. An angle θ1 made between the second direction Y and the first extending direction A1 is substantially equal to an angle θ2 made between the second direction Y and the second extending direction A2 and is approximately in a range of, for example, 5° to 15°.

The common electrode CE extend in the second direction Y over the gate lines G1 to G3, extend in the first direction X over the source lines S1 to S4, and is arranged in each of the pixels PX1 to PX6. In the common electrode CE, an opening portion for electric connection between the pixel electrode and the switching element, which is not described in detail, is formed in each element.

The pixel PX1 comprises the switching element SW1 and the pixel electrode PE1. The switching element SW1 is electrically connected with the gate line G2 and the source line S1. The pixel electrode PE1 is connected to the switching element SW1. The pixel PX2 comprises the switching element SW2 and the pixel electrode PE2. The switching element SW2 is electrically connected with the gate line G2 and the source line S2. The pixel electrode PE2 is connected to the switching element SW2. The pixel PX3 comprises the switching element SW3 and the pixel electrode PE3. The switching element SW3 is electrically connected with the gate line G2 and the source line S3. The pixel electrode PE3 is connected to the switching element SW3.

Similarly, the pixel PX4 comprises the switching element SW4 electrically connected with the gate line G3 and the source line S1, and the pixel electrode PE4 connected to the switching element SW4. The pixel PX5 comprises the switching element SW5 electrically connected with the gate line G3 and the source line S2, and the pixel electrode PE5 connected to the switching element SW5. The pixel PX6 comprises the switching element SW6 electrically connected with the gate line G3 and the source line S3, and the pixel electrode PE6 connected to the switching element SW6.

Each of the switching elements SW1 to SW6 is composed of, for example, a thin-film transistor (TFT). Each of the pixel electrodes PE1 to PE6 is located above the common electrode CE. Each of the pixel electrodes PE1 to PE3 is formed in an island-like shape corresponding to the pixel shape extending in the first extending direction A1. Each of the pixel electrodes PE1 to PE3 includes slits SLA extending in the first extending direction A1. Each of the pixel electrodes PE4 to PE6 is formed in an island-like shape corresponding to the pixel shape extending in the second extending direction A2. Each of the pixel electrodes PE4 to PE6 includes slits SLB extending in the second extending direction A2. Each of the slits SLA and SLB faces the common electrode CE.

An alignment direction R1 of the first alignment film AL1 is parallel to an alignment direction R2 of the second alignment film AL2 disposed on the second substrate SUB2. The alignment directions R1 and R2 may be opposite to each other or the same as each other. For example, the alignment directions R1 and R2 intersect the first extending direction A1 and the second extending direction A2 at an acute angle greater than or equal to 45° and smaller than 90°. In the example illustrated, the alignment directions R1 and R2 are parallel to the first direction X. In the present embodiments, the first alignment film AL1 and the second alignment film AL2 are subjected to optical alignment treatment. The optical alignment treatment aims to cause the alignment film material to achieve a predetermined alignment restriction force by irradiating the alignment film material with ultraviolet rays in a predetermined direction. In the present embodiments, the alignment films subjected to the optical alignment treatment are called optical alignment films.

Figure 3:
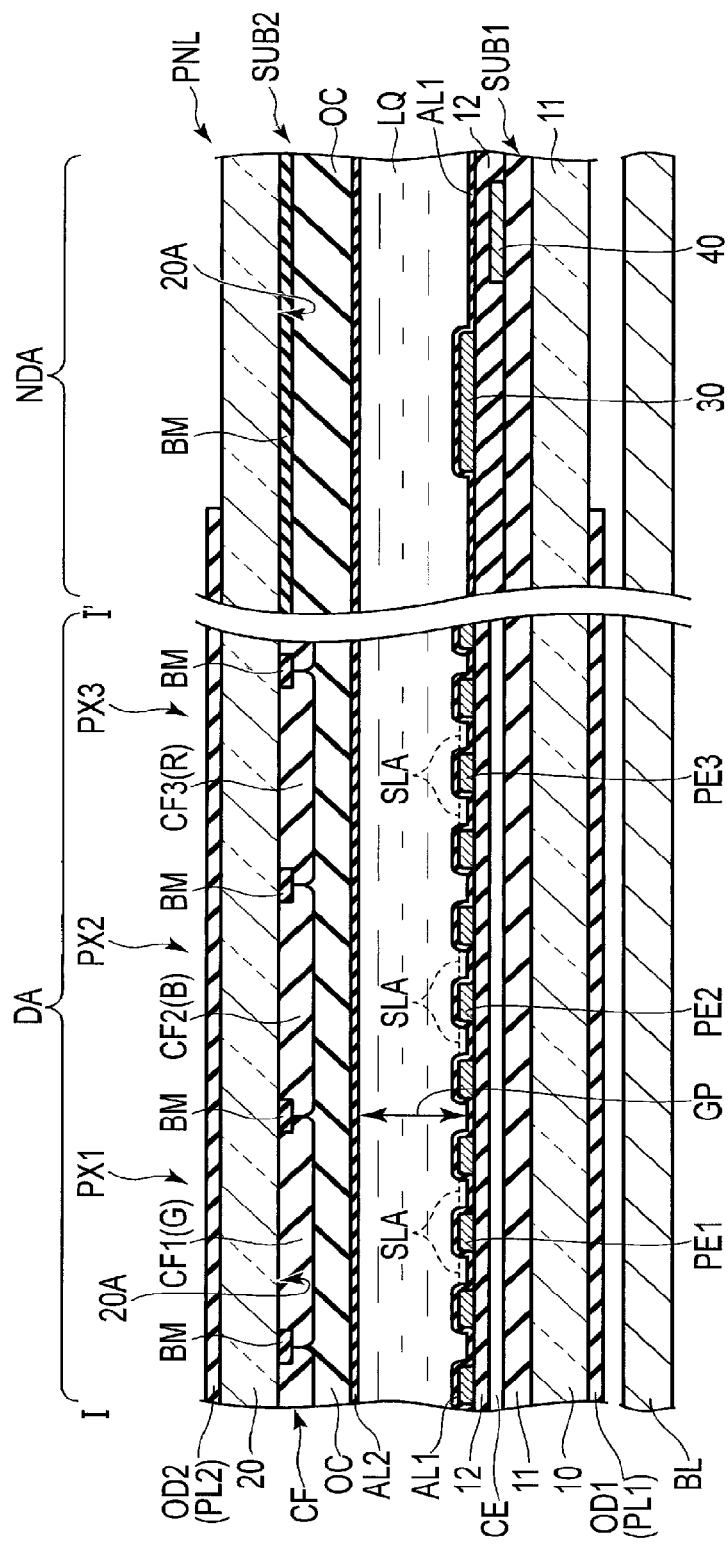
FIG. 3 is a cross-sectional view showing the display panel PNL seen along line I-I' of FIG. 2. A cross-section of the display panel PNL in a non-display area NDA is also illustrated in FIG. 3.

FIG. 3 is a cross-sectional view showing the display panel PNL seen along line I-I' of FIG. 2. A cross-section of the display panel PNL in a non-display area NDA is also illustrated in FIG. 3.

The first substrate SUB1 is formed by using a first insulating substrate 10, which is transparent, such as a glass substrate or a resin substrate. The first substrate SUB1 includes the common electrode CE, the pixel electrodes PE1 to PE3, a first insulating film 11, a second insulating film 12, a first alignment film AL1 and the like, on the side of the first insulating substrate 10 which is opposed to the second substrate SUB2. It should be noted that the first substrate SUB1 also includes gate lines, source lines, switching elements and the like (not shown).

The common electrode CE is formed on the first insulating film 11. The common electrode CE is covered with the second insulating film 12. The gate lines, source lines, switching elements and the like (not shown) are formed between the first insulating substrate 10 and the first insulating film 11. The pixel electrodes PE1 to PE3 are formed on the second insulating film 12 and opposed to the common electrode CE. Slits SLA are formed in each of the pixel electrodes PE1 to PE3. The common electrode CE and the pixel electrodes PE1 to PE3 are formed of, for example, a transparent conductive material such as indium-tin-oxide (ITO) or indium-zinc-oxide (IZO). The pixel electrodes PE1 to PE3 are covered with the first alignment film AL1. The first alignment film AL1 also covers the second insulating film 12. The first alignment film AL1 is formed of, for example, a material having a horizontal alignment property and disposed on a surface of the first substrate SUB1 which is in contact with the liquid crystal layer. LQ.

In the example illustrated, the common electrode CE corresponds to a first electrode, the pixel electrodes PE1 to PE3 correspond to second electrodes, and the second insulating film 12 corresponds to an interlayer insulating film. However, the pixel electrodes PE1 to PE3 may be formed between the first insulating film 11 and the second insulating film 12, and the common electrode CE may be formed between the second insulating film 12 and the first alignment film AL1. In this case, the pixel electrodes PE1 to PE3 correspond to first electrodes while the common electrode CE corresponds to a second electrode.

The first substrate SUB1 includes a shielding electrode 30 and a trap electrode 40 in the non-display area NDA. In the example illustrated, the shielding electrode 30 is formed between the second insulating film 12 and the first alignment film AL1, and the trap electrode 40 is formed between the first insulating film 11 and the second insulating film 12, but the positions of both the electrodes are not limited to those in the example illustrated. A predetermined potential is supplied to the shielding electrode 30. For example, the shielding electrode 30 has the same potential as the common electrode CE. The shielding electrode 30 can be formed of the same material as the pixel electrodes but may be formed of the other metallic materials or the like. The trap electrode 40 is supplied with an electric potential different from the electric potential supplied to the shielding electrode 30. For example, the trap electrode 40 is electrically connected to a line (not shown) supplied with a fixed potential, for example, a line to which an off voltage of the switching element, i.e., a gate-low voltage is applied. The trap electrode 40 can be formed of the same material as the common electrode but may be formed of the other metallic materials or the like.

The second substrate SUB2 is formed by using a second insulating substrate 20, which is transparent, such as a glass substrate or a resin substrate. The second substrate SUB2 includes a light-shielding member BM, color filters CF1 to CF3, an overcoat layer OC, a second alignment film AL2 and the like, on a side of the second insulating substrate 20 which is opposed to the first substrate SUB1.

The light-shielding member BM is formed on an inner surface 20A of the second insulating substrate 20 which is opposed to the first substrate SUB1. The light-shielding member BM is also formed on the inner surface 20A of the non-display area NDA. The color filters CF1 to CF3 are also formed on the inner surface 20A. The color filters CF1 to CF3 are color filters of colors different from each other. For example, the color filter CF1 is formed of a resin material colored in green (G). The color filter CF2 is formed of a resin material colored in blue (B). The color filter CF3 is formed of a resin material colored in red (R).

The overcoat layer OC covers the color filters CF1 to CF3. In the non-display area NDA, the overcoat layer OC covers the light-shielding member BM. The overcoat layer OC is formed of a transparent resin material. The overcoat layer OC corresponds to an organic insulating film disposed on the second substrate SUB2. For example, the overcoat layer OC is formed of a transparent photo-curable resin material having acrylic system resin or epoxy system resin as its major component, which contains a cross-linking monomer, for example, a cross-linking agent having phthalate structure. The overcoat layer OC is covered with the second alignment film AL2. The second alignment film AL2 is formed of, for example, a material having the horizontal alignment property and disposed on a surface of the second substrate SUB2 which is in contact with the liquid crystal layer LQ.

The first substrate SUB1 and the second substrate SUB2 as described above are disposed such that the first alignment film AL1 and the second alignment film AL2 are opposed to each other. The first substrate SUB1 and the second substrate SUB2 are bonded to each other by a sealing member with a cell gap GP formed between the substrates. The liquid crystal layer LQ is held in the cell gap GP formed between the first alignment film AL1 of the first substrate SUB1 and the second alignment film AL2 of the second substrate SUB2. The cell gap corresponds to a distance between the first alignment film AL1 and the second alignment film AL2 extending in the normal line of the display panel PNL, and defined by, for example, the height of the spacer. In the present embodiments, the liquid crystal layer LQ is formed of a liquid crystal material having a negative dielectric anisotropy. The liquid crystal layer LQ is formed of a liquid crystal material having the viscosity of 20 mPa*s or more under the temperature condition of 65° C. The cell gap GP is 2.3 μm or more and 3.3 μm or less.

The illumination device BL is opposed to the first substrate SUB1. Various types of the devices are applicable as the illumination device BL, but explanations on details of the structure are omitted here.

A first optical element OD1 including a first polarizer PL1 is disposed on an outer surface of the first insulating substrate 10. A second optical element OD2 including a second polarizer PL2 is disposed on an outer surface of the second insulating substrate 20. For example, a first absorption axis of the first polarizer PL1 and a second absorption axis of the second polarizer PL2 are orthogonal to each other in the X-Y plane. Either of the first absorption axis and the second absorption axis is parallel to the initial alignment direction of liquid crystal molecules LM.

Next, operations of the liquid crystal display device having the above-described configuration will be explained.

At an OFF time at which the voltage is not applied to the liquid crystal layer LQ, no electric field is formed between the pixel electrode PE and the common electrode CE. For this reason, the liquid crystal molecules LM included in the liquid crystal layer LQ are initially aligned in the first direction X in the X-Y plane by an alignment restriction force of the first alignment film AL1 and the second alignment film AL2, as illustrated by a solid line in FIG. 2. In other words, the initial alignment direction of the liquid crystal molecules LM is parallel to the first direction X. At the OFF time, part of light from the illumination device BL is transmitted through the first polarizer PL1 and is made incident on the display panel PNL. The light incident on the display panel PNL is linearly polarized light orthogonal to, for example, the first absorption axis of the first polarizer PL1. The polarized state of the linearly polarized light is hardly varied when the light is transmitted through the display panel PNL at the OFF time. For this reason, most part of the linearly polarized light transmitted through the display panel PNL is absorbed by the second polarizer PL2 (black display).

In contrast, the fringing field is formed between the pixel electrode PE and the common electrode CE at an ON time at which the voltage is applied to the liquid crystal layer LQ. For this reason, the liquid crystal molecules LM are aligned in an orientation different from the initial alignment direction in the X-Y plane, as illustrated by a broken line in FIG. 2. In the negative liquid crystal material, for example, the liquid crystal molecules LM of the pixel PX3 are rotated counterclockwise to be aligned in a direction approximately orthogonal to the fringing field, in the X-Y plane, and the liquid crystal molecules LM of the pixel PX6 are rotated clockwise to be aligned in a direction approximately parallel to the fringing field, in the X-Y plane. At this time, the liquid crystal molecules LM are aligned in a direction corresponding to the magnitude of the electric field. At the ON time, linearly polarized light orthogonal to the first absorption axis of the first polarizer PL1 is made incident on the display panel LPN, and its polarized state is varied in accordance with the aligned state of the liquid crystal molecules LM when the light is transmitted through the liquid crystal layer LQ. For this reason, at the ON time, at least part of the linearly polarized light passing through the liquid crystal layer LQ is transmitted through the second polarizer PL2 (white display).

In such a configuration, a normally black mode is implemented.

In the liquid crystal display device using the negative liquid crystal material, the liquid crystal molecules LM are rotated in a plane approximately parallel to the X-Y plane even if a component vertical to the X-Y plane of the fringing field is applied to the liquid crystal layer. In other words, a phenomenon in which the liquid crystal molecules LM rise up in the direction vertical to the X-Y plane can be suppressed. For this reason, the transmittance per pixel can be improved and the contrast ratio can also be improved, as compared with the liquid crystal display device using the positive liquid crystal material.

Incidentally, the present inventor have variously reviewed the mechanism of generation of black non-uniformity in display which results from aggregation of the ionic impurities impregnated into the liquid crystal layer LQ, in a part of the display area DA, in the general liquid crystal display device. First, one of the reasons for generation of the ionic impurities is that the first alignment film AL1 and the second alignment film AL2 used for the display panel PNL are "optical alignment films" subjected to optical alignment treatment. In other words, the alignment film material is irradiated with the ultraviolet rays by the optical alignment treatment. At this time, the alignment film material and various organic insulating films (for example, the overcoat layer OC) which become the bases of the alignment films are deteriorated and generate ionic impurities. The generated ionic impurities can easily be impregnated into the liquid crystal layer LQ after the display panel PNL is assembled. Alternate reason for generation of the ionic impurities is that moisture containing the ionic impurities is impregnated into the display panel PNL from the outside. More organic insulating films have higher moisture permeability than inorganic insulating films. For this reason, the organic insulating film exposed to the outside, of the members constituting the display panel PNL, can form moisture path and the ionic impurities contained in the moisture can easily be impregnated into the liquid crystal layer LQ. In particular, the negative liquid crystal material has properties of easily taking in the ionic impurities.

The ionic impurities impregnated into the liquid crystal layer LQ drift inside the liquid crystal layer LQ and aggregate at an end portion of the area surrounded by the sealing member SE by driving the liquid crystal display device. Recently, requests for narrowing the frame by reducing the width of the non-display area NDA at the liquid crystal display device have been increased. For this reason, the drifting ionic impurities aggregate near the sealing member SE, and further aggregate in not only the non-display area NDA, but also the display area DA. The ionic impurities aggregated on the surface of the first alignment film AL1 and the second alignment film AL2, in the display area DA, become the reason for causing the leakage of the voltage held in each of the pixels PX. For this reason, in the normally black mode, the display becomes the black display state of the OFF time for the reason that the voltage held by the pixels PX exhibiting white color at the ON time is reduced and, consequently, the black display is visually recognized as black non-uniformity in display.

FIG. 4 shows graphs each representing a result of simulation of a relationship between a screen size of the display panel PNL and an ion density of ionic impurities in a liquid crystal layer LQ. In (A) and (B) of the drawing, a horizontal axis represents a diagonal dimension (inch) of the display area DA representing the screen size of the display panel PNL while a vertical axis represents the ion density (relative value) obtained by standardizing the ion density as 1 in a case where the screen size is five inches.

(A) shows a result of simulation of the ion density of the ionic impurities impregnated from the outside by considering the moisture permeability of the members constituting the display panel PNL. It can be understood that as the screen size is smaller, the volume of the liquid crystal layer LQ is reduced and the ion density tends to be increased.

(B) shows a result of simulation of the ion density of the ionic impurities generated from the organic insulating films (first alignment film AL1, second alignment film AL2, overcoat layer OC and the like) constituting the display panel PNL when the ultraviolet rays are radiated. It can be understood that as the screen size is larger, the surface area of the organic insulating films is increased and the ion density tends to be increased.

As shown in FIG. 4, the ionic impurities are stored in the display panel PNL by the ultraviolet rays irradiation and the impregnation from the outside, but are varied with respect to the dominant factors based on the screen size. In other words, the ionic impurities impregnated from the outside are predominant for the display panel PNL having a smaller screen size while the ionic impurities generated by the ultraviolet rays irradiation are dominant for the display panel PNL having a larger screen size. For this reason, increase in the ion concentration of the ionic impurities can be suppressed by reducing the moisture permeability of the members constituting the display panel PNL, on the display panel PNL having the smaller screen size. In addition, increase in the ion concentration of the ionic impurities can be suppressed by increasing the moisture permeability of the members constituting the display panel PNL, on the display panel PNL having the smaller screen size.

FIG. 5 is a graph showing a result of simulation of a relationship between the cell gap GP of the display panel PNL and a viscosity resistance $\eta 1$. In the drawing, the horizontal axis represents the cell gap GP (μm) while the vertical axis represents the viscosity resistance $\eta 1$ (relative value) obtained by standardizing the viscosity resistance $\eta 1$ as 1 in a case where the sell gap GP is 3.2 μm. Poiseuille flow obtained when the liquid crystal layer LQ is disposed between two flat plates arranged parallel was assumed, and the viscosity resistance $\eta 1$ to the cell gap (distance between the flat plates) GP was calculated according to Langevin equation by simulation. The ionic impurities drifting in the liquid crystal layer LQ is subjected to viscosity resistance $\eta$ of the liquid crystal layer LQ. The viscosity resistance $\eta$ is determined based on both viscosity $\gamma 1$ of the liquid crystal layer LQ and the viscosity resistance $\eta 1$ received from two flat plate interfaces. As illustrated in the drawing, as the cell gap GP is smaller two flat plate interfaces become closer, and the tendency that the viscosity resistance $\eta 1$ received from the flat plate interfaces increases can be understood. In other words, the drift of the ion impurities can be suppressed and the aggregation of the ionic impurities can be further suppressed, by optimizing the viscosity resistance $\eta$ of the liquid crystal layer LQ by both the viscosity $\gamma 1$ of the liquid crystal layer LQ and the cell gap GP which determines the viscosity resistance $\eta 1$. Since the cell gap GP is set to be 2.3 μm or more and 3.3 μm or less as described above, in the present embodiments, the viscosity resistance $\eta$ needs to be optimized to suppress the aggregation of the ionic impurities at the cell gap GP. Under the condition that the cell gap GP is smaller (i.e., the cell gap GP becomes closer to 2.3 μm) within the range of the cell gap GP, an effect that the viscosity resistance $\eta 1$ is increased as illustrated and the drift and aggregation of the ionic impurities are suppressed can be expected. In contrast, under the condition that the cell gap GP is greater (i.e., the cell gap GP becomes closer to 3.3 μm), the drift and aggregation of the ionic impurities can be suppressed by optimizing the viscosity $\gamma 1$ of the liquid crystal layer LQ since the viscosity resistance $\eta 1$ is reduced.

The present inventor calculated the viscosity $\gamma 1$ of the liquid crystal layer LQ which does not cause black non-uniformity in display in a reliability test, based on the above-explained knowledge, by simulation. In the reliability test, a step of causing the display panel PNL to stand in the environment of the temperature of 65° C. and moisture of 90% is performed at several times. The display panel PNL used has a screen size of 5 inches and the cell gap GP of 3.2 μm. If the ionic impurities in the display area DA are assumed to drift linearly, the longest drift distance is a distance of a diagonal line in the display area DA, i.e., 5 inches. If the drift distance is 5 inches, substantially all ionic impurities in the display area DA are assumed to aggregate at one of corner portions of the display area DA. In the simulation reliability test, the condition that the time required for aggregation of the ionic impurities (or the time required for the drift distance to be 5 inches) corresponds to 30 steps or more (about 1,000 hours) is assumed to be acceptable (i.e., the reliability test is determined to be OK).

FIG. 6 is a graph showing a result of simulation of a relationship between the time of the reliability test and the drift distance of the ionic impurities. In the graph, the horizontal axis represents the time step (step) corresponding to the time of the reliability test while the vertical axis represents the drift distance (inch) of the ionic impurities. In the simulation, the time required for aggregation of the ionic impurities was calculated according to the Langevin equation, using the viscosity $\gamma 1$ of the liquid crystal layer LQ as a parameter. When the viscosity $\gamma 1$ under the temperature condition of 65° C. was 22 mPa*s, the time required for the aggregation was approximately 30 steps (reliability test OK). Similarly, when the viscosity $\gamma 1$ was 26 mPa*s, the time required for the aggregation was approximately 35 steps (reliability test OK). In contrast, when the viscosity $\gamma 1$ was 15 mPa*s, the aggregation occurred in approximately 20 steps (reliability test NG). In contrast, when the viscosity $\gamma 1$ was 18 mPa*s, the aggregation occurred in approximately 25 steps (reliability test NG).

The simulation result indicates that the aggregation of the ionic impurities can be suppressed and occurrence of black non-uniformity in display can be prevented within the general use range, by using the liquid crystal material having the viscosity $\gamma 1$ of 20 mPa*s or more under the temperature condition of 65° C. to the display panel PNL having the screen size of 5 inches and the cell gap GP of 3.2 μm. Since the drift of the ionic impurities is suppressed as the viscosity γ1 is greater, the upper limit of the viscosity γ1 is not particularly set from the viewpoint of suppressing occurrence of the black non-uniformity in display, but the viscosity γ1 is desirably 83 mPa*s or less under the temperature condition of 65° C. from the viewpoint of the display quality.

According to the present embodiments, as explained above, even if the first alignment film AL1 and the second alignment film AL2 are the optical alignment films, the drift of the ionic impurities in the liquid crystal layer LQ can be suppressed and the occurrence of the black non-uniformity in display resulting from the aggregation of the ionic impurities can also be suppressed, by applying the conditions that the liquid crystal layer LQ is formed of the liquid crystal material having the viscosity of 20 mPa*s or more under a condition of 65° C. and that the cell gap GP is 2.3 μm or more and 3.3 μm or less. Deterioration in display quality can be therefore suppressed.

Next, simulation of the same reliability test of the display panel PNL having the cell gap GP of 3.2 μm, using a liquid crystal material having the viscosity of 22 mPa*s under the temperature condition of 65° C., was performed by using the screen size as a parameter.

FIG. 7 is a graph showing a result of simulation of a relationship between the screen size and the time of the reliability test. In the graph, the horizontal axis represents the screen size (inch) while the vertical axis represents the time step (step) corresponding to the time required for substantially all ionic impurities to aggregate at one of corner portions of the display area DA. As illustrated in the graph, under the condition that the viscosity γ1 and the cell gap GP are fixed, the ionic impurities aggregate in a short time of less than 30 steps since the longest drift distance is reduced as the screen size is smaller. For this reason, any display panel PNL having the screen size of less than 5 inches is determined to be NG in the reliability test. For example, the time step is approximately 24 steps when the screen size is 4.5 inches, approximately 19 steps when the screen size is 4 inches, and approximately 15 steps when the screen size is 3.5 inches.

In contrast, when the screen size is larger than 5 inches, influence from the ionic impurities generated by irradiation of ultraviolet rays is more dominant than influence from the ionic impregnating from the outside, as explained with reference to FIG. 4. For this reason, when the screen size is 5.5 inches or 6 inches, the time step of approximately thirty steps can be achieved (i.e., the reliability test is OK) similarly to the case where the screen size is 5 inches, by taking a measure to improve the resistance to ultraviolet rays. In contrast, if the measure to improve the resistance to ultraviolet rays is not taken, the time step is approximately 27 steps when the screen size is 5.5 inches or approximately 25 steps when the screen size is 6 inches, and the reliability test is determined to be NG in any one of the cases.

Next, a condition that the reliability test is also determined to be OK for the display panel of the other screen size was calculated, under the condition that the reliability test is determined to be OK, i.e., the condition that the liquid crystal material having the viscosity γ1 of 22 mPa*s under the temperature condition of 65° C. is used for the display panel PNL having the screen size of 5 inches and the cell gap GP of 3.2 μm. In other words, the viscosity (γ1) of the liquid crystal layer LQ for which the reliability test is determined to be OK, and the cell gap GP determining the viscosity η1 were converted, based on the ion density (relative value) shown in FIG. 4(A), for the display panel PNL of each screen size.

FIG. 8 is a table summarizing the conditions for determining the reliability test to be OK for each screen size. The table represents the ion density (relative value), the viscosity (mPa*s), the cell gap (μm), the viscosity resistance η of the liquid crystal layer LQ (relative value), and the response time (relative value), in order, for each screen size. As regards the ion density, the viscosity resistance and the response time, the relative values standardized by setting the value in a case where the screen size of 5 inches is refereed to as 1. In addition, the values of the viscosity are varied depending on the temperature even if the same material is used, but indicate the values under the temperature condition in the reliability test, for example, the values at 65° C.

If the screen size of 5 inches is referred to as 1 as represented in (A) of FIG. 4, the ion density is 1.13 when the screen size is 4.5 inches, 1.3 when the screen size is 4.5 inches, and 1.5 when the screen size is 3.5 inches.

As for the viscosity γ1, if the value at which the reliability test is determined to be OK when the temperature condition is constant and the screen size is 5 inches is assumed to be γx or more, the viscosity γ1 at which the reliability test is determined to be OK for the other screen sizes is converted as follows, based on the ion density. For example, the viscosity γ1 is 1.13 times or more as great as γx when the screen size is 4.5 inches, 1.3 times or more as great as γx when the screen size is 4 inches, and 1.5 times or more as great as γx when the screen size is 3.5 inches. For example, if the temperature condition is 65° C. and the viscosity γx is 20 mPa*s or more, the viscosity γ1 is 22.6 mPa*s or more when the screen size is 4.5 inches, 26 mPa*s or more when the screen size is 4 inches, and 30 mPa*s or more when the screen size is 3.5 inches.

As for the cell gap GP, if the value at which the reliability test is determined to be OK when the screen size is 5 inches is assumed to be GPx, the cell gap GP at which the reliability test is determined to be OK for the other screen sizes is converted as follows, based on the ion density. The cell gap GP is smaller than or equal to a value obtained by dividing GPx by a square root of 1.13 when the screen size is 4.5 inches, smaller than or equal to a value obtained by dividing GPx by a square root of 1.3 when the screen size is 4 inches, and smaller than or equal to a value obtained by dividing GPx by a square root of 1.5 when the screen size is 3.5 inches. For example, if the cell gap GPx is 3.2 μm, the cell gap GP is 3.0 μm or less when the screen size is 4.5 inches, 2.8 μm or less when the screen size is 4 inches, and 2.6 μm or less when the screen size is 3.5 inches.

The viscosity resistance η is the value calculated based on the viscosity γ1 and the cell gap GP and, if the value at which the reliability test is determined to be OK when the screen size is 5 inches is assumed to be 1, the viscosity resistance η at which the reliability test is determined to be OK for the other screen sizes is as follows. The viscosity resistance is 1.24 or more when the screen size is 4.5 inches, 1.69 or more when the screen size is 4 inches, and 2.25 or more when the screen size is 3.5 inches.

As for the response time, if the screen size of 5 inches is referred to as 1, the value was 1 or less for any one of the other screen sizes. It is needless to say that the reliability test of simulation was determined to be OK for the display panel of any one of the screen sizes.

Figure 9:
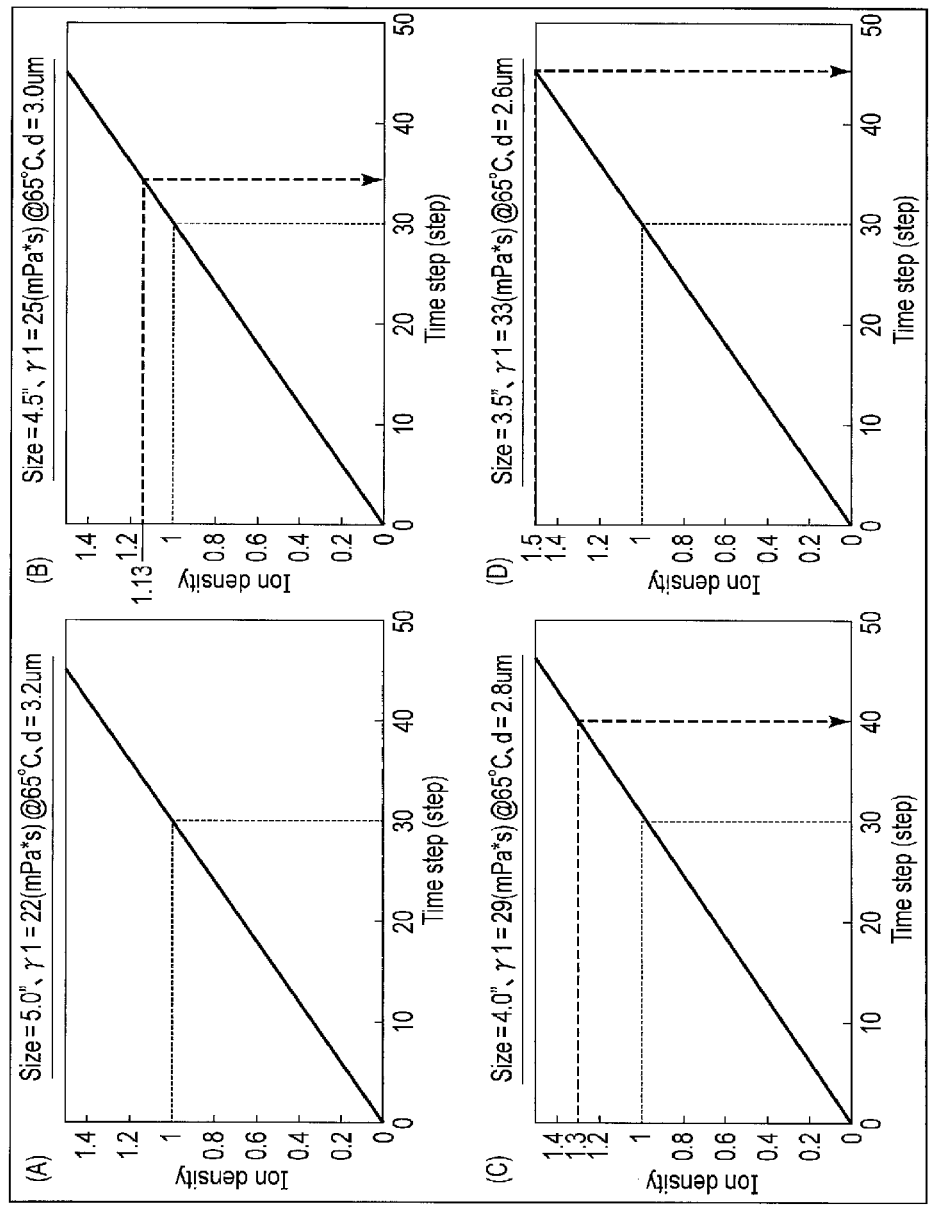
FIG. 9 shows graphs for explaining examples of the display panel PNL of the screen sizes which satisfy the conditions shown in FIG. 8.

FIG. 9 shows graphs for explaining examples of the display panel PNL of the screen sizes which satisfy the conditions shown in FIG. 8. In (A) to (D) of the drawing, the horizontal axis represents the time step (step) corresponding to the time required for substantially all ionic impurities to aggregate at one of corner portions of the display area DA while the vertical axis represents the ion density (relative value). The ion density is referred to as 1 when the time step is 30 steps at which the reliability test is determined to be OK for display panel PNL having the screen size of 5 inches.

(A) corresponds to an example of the display panel PNL having the screen size of 5 inches. When the temperature is 65° C., the viscosity γ1 is 22 Pa*s and the cell gap is 3.2 μm.

(B) corresponds to an example of the display panel PNL having the screen size of 4.5 inches. When the temperature is 65° C., the viscosity γ1 is 25 Pa*s and the cell gap is 3 μm. The ion density is 1.13, and the time step of 35 steps can be achieved. The liquid crystal material having the viscosity γ1 of 22 mPa*s under the temperature condition of 65° C. was also used for the display panel PNL having the screen size of 4.5 inches, and the time step was approximately 24 steps as represented in FIG. 7 for the display panel having the cell gap GP of 3.2 μm.

(C) corresponds to an example of the display panel PNL having the screen size of 4 inches. When the temperature is 65° C., the viscosity γ1 is 29 Pa*s and the cell gap is 2.8 μm. The ion density is 1.3, and the time step of 40 steps can be achieved. The liquid crystal material having the viscosity γ1 of 22 mPa*s under the temperature condition of 65° C. was also used for the display panel PNL having the screen size of 4 inches, and the time step was approximately 19 steps as represented in FIG. 7 for the display panel having the cell gap GP of 3.2 μm.

(D) corresponds to an example of the display panel PNL having the screen size of 3.5 inches. When the temperature is 65° C., the viscosity γ1 is 33 Pa*s and the cell gap is 2.6 μm. The ion density is 1.5, and the time step of 45 steps can be achieved. The liquid crystal material having the viscosity γ1 of 22 mPa*s under the temperature condition of 65° C. was also used for the display panel PNL having the screen size of 3.5 inches, and the time step was approximately 15 steps as represented in FIG. 7 for the display panel having the cell gap GP of 3.2 μm.

Thus, the time step of 30 steps or more could be achieved by optimizing the viscosity γ1 and the cell gap GP to satisfy the conditions represented in FIG. 8, for the display panel PNL of each screen size.

Incidentally, the above explanations relate to a method of suppressing the drift of the ionic impurities included in the liquid crystal layer LQ and suppressing occurrence of the black non-uniformity in display caused by aggregation of the ionic impurities. In contrast, combination of methods of suppressing impregnation of the ionic impurities into the liquid crystal layer LQ is more beneficial.

As one of the methods, reducing the moisture permeability of the members constituting the display panel PNL is also beneficial as explained with reference to FIG. 4. In the present embodiments, desirably, the moisture permeability of the organic insulating film constituting the display panel PNL is 5E-9 mol/cm$^2$ or less. As a moisture permeability evaluation method, thermal desorption spectrometry (TDS) is employed.

In addition, as the other method of suppressing the impregnation of the ionic impurities, improving the resistance to ultraviolet rays in the members constituting the display panel PNL is beneficial as explained with reference to FIG. 4. In the present embodiments, desirably, a difference (spectral variation amount) between a minimum value and a maximum value of the absorbance spectrum before and after the ultraviolet rays irradiation, in the organic insulating film constituting the display panel PNL, is 0.0030 or less. The absorbance spectrum is measured by a Fourier transform infrared spectrometer (FTIR).

FIG. 10 is a table summarizing a relationship among a result of the reliability test of each configuration example of the display panel, the moisture permeability of each overcoat layers OC, and spectral variation amount of each overcoat layers OC. The configuration examples are display panels constituted under the same conditions except materials of the overcoat layers OC. Four types of overcoat layers OC are prepared here. In the table, four overcoat layers OC are distinguished as OC-A, OC-B, OC-C and OC-D.

The moisture permeability (mol/cm$^2$) of each overcoat layer OC was measured before and after the ultraviolet rays irradiation in the formation of the optical alignment film. In each of the configuration examples OC-B, OC-C and OC-D, the moisture permeability meets the condition of 5E-9 mol/cm$^2$ or less before and after the ultraviolet rays irradiation. In the configuration example OC-A, the moisture permeability does not meet the condition of 5E-9 mol/cm$^2$ or less before and after the ultraviolet rays irradiation.

Figure 11:
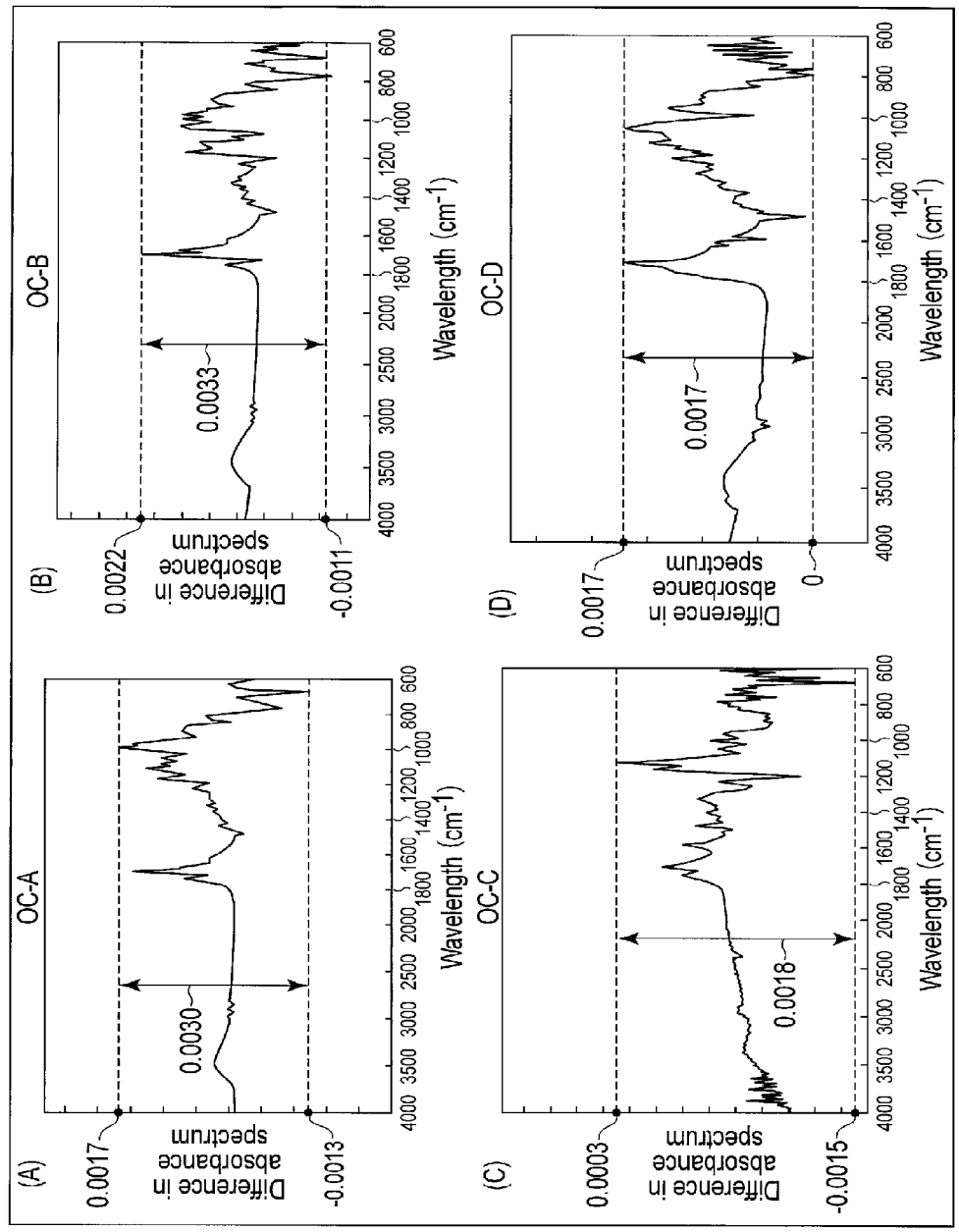
FIG. 11 shows plots of difference in absorbance spectrum for the overcoat layers of the respective configuration examples.

As for the spectral variation amount of each overcoat layer OC, a difference between the absorbance spectrum measured before the ultraviolet rays irradiation and the absorbance spectrum measured after the ultraviolet rays irradiation in the formation of the optical alignment film was plotted, and a difference between a minimum value and a maximum value of the difference in absorbance spectrum was obtained. FIG. 11 shows plots of difference in absorbance spectrum for the overcoat layers of the respective configuration examples. In the drawing, (A) to (D) correspond to four configuration examples distinguished as OC-A, OC-B, OC-C and OC-D. In (A) to (D) of the drawing, the horizontal axis represents a wave number (i.e. a inverse of a wavelength) (cm$^{-1}$) while the vertical axis represents the difference between the absorbance spectra before and after the ultraviolet rays irradiation. In each of the configuration examples OC-A, OC-C and OC-D, the spectral variation amount meets the condition of 0.0030 or less. In the configuration example OC-B, the spectral variation amount does not meet the condition of 0.0030 or less.

When the reliability test of the configuration examples was performed under the same conditions (letting the display panel PNL stand still in the environment of the temperature of 65° C. and the moisture of 90%) as those explained above, two configuration examples distinguished as OC-A and OC-B were determined to be NG and two configuration examples distinguished as OC-C and OC-D were determined to be OK.

Next, a method of trapping ionic impurities included in the liquid crystal layer LQ will be explained. In the present embodiments, the display panel PNL includes the shielding electrode 30 and the trap electrode 40 in the non-display area NDA as explained above with reference to FIG. 3. If the ionic impurities which should be trapped are positive ions, for example, the electric potential of the trap electrode 40 is set to be lower than the electric potential of the shielding electrode 30. The ionic impurities are therefore trapped by the trap electrode 40 due to the Coulomb force. If the ionic impurities which should be trapped are negative ions, the electric potential of the trap electrode 40 is set to be higher than the electric potential of the shielding electrode 30. The shielding electrode 30 and the trap electrode 40 can be disposed at desired positions in the non-display area NDA. For this reason, aggregation of the ionic impurities in the display area DA can be suppressed.

As described above, the liquid crystal display device capable of suppressing the deterioration in display quality can be provided by the embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising: a first substrate including a first alignment film;
a second substrate including a second alignment film opposed to the first alignment film; and
a liquid crystal layer held in a cell gap between the first substrate and the second substrate, the liquid crystal layer being formed of a liquid crystal material having a viscosity of 20 mPa*s or more under a condition of 65° C.,
the cell gap being greater than or equal to 2.3 μm and smaller than or equal to 3.3 μm,
wherein the second substrate further includes an organic insulating film, and the organic insulating film is formed of a transparent photo-curable resin material which includes as a main component an acrylic system resin or an epoxy system resin containing a cross-linking monomer, and wherein the organic insulating film has a moisture permeability of 5E-9 mol/cm$^2$ or less.

2. The liquid crystal display device of claim 1, wherein the first substrate further includes a first electrode, an interlayer insulating film covering the first electrode, and a second electrode which is opposed to the first electrode on the interlayer insulting film and is covered by the first alignment film, and
a dielectric anisotropy of the liquid crystal material is negative.

3. The liquid crystal display device of claim 1, wherein a difference between a maximum value and a minimum value of a difference in absorbance spectrum before and after ultraviolet rays irradiation, in the organic insulating film, is 0.0030 or less.

4. The liquid crystal display device of claim 1, further comprising a shielding electrode of a predetermined electric potential and a trap electrode having an electric potential different from the electric potential of the shielding electrode, in a non-display area.

5. The liquid crystal display device of claim 1, wherein each of the first alignment film and the second alignment film is an optical alignment film.

6. A liquid crystal display device, comprising:
a first substrate including a first alignment film;
a second substrate including an organic insulating film and a second alignment film which is opposed to the first alignment film; and
a liquid crystal layer held in a cell gap between the first substrate and the second substrate,
the organic insulating film being formed of a transparent photo-curable resin material including as a main component an acrylic system resin or an epoxy system resin containing a cross-linking monomer,
the organic insulating film having a moisture permeability of 5E-9 mol/cm$^2$ or less, and a difference between a maximum value and a minimum value of a difference in absorbance spectrum before and after ultraviolet rays irradiation of 0.0030 or less.

7. The liquid crystal display device of claim 6, wherein the liquid crystal layer is formed of a liquid crystal material having a viscosity of 20 mPa*s or more under a condition of 65° C.

8. The liquid crystal display device of claim 6, wherein the cell gap is greater than or equal to 2.3 μm and less than or equal to 3.3 μm.

9. The liquid crystal display device of claim 6, wherein the first substrate further includes a first electrode, an interlayer insulating film covering the first electrode, and a second electrode which is opposed to the first electrode on the interlayer insulting film and is covered by the first alignment film, and
a dielectric anisotropy of the liquid crystal material is negative.

10. The liquid crystal display device of claim 6, further comprising a shielding electrode of a predetermined electric potential and a trap electrode having an electric potential different from the electric potential of the shielding electrode, in a non-display area.

11. The liquid crystal display device of claim 6, wherein each of the first alignment film and the second alignment film is an optical alignment film.

* * * * *